Feb. 25, 1958   J. S. NELSON   2,824,421
CHAIN ATTACHMENT HAVING A SPLIT LOOP
PORTION AND A CLEVIS PORTION
Filed April 9, 1956
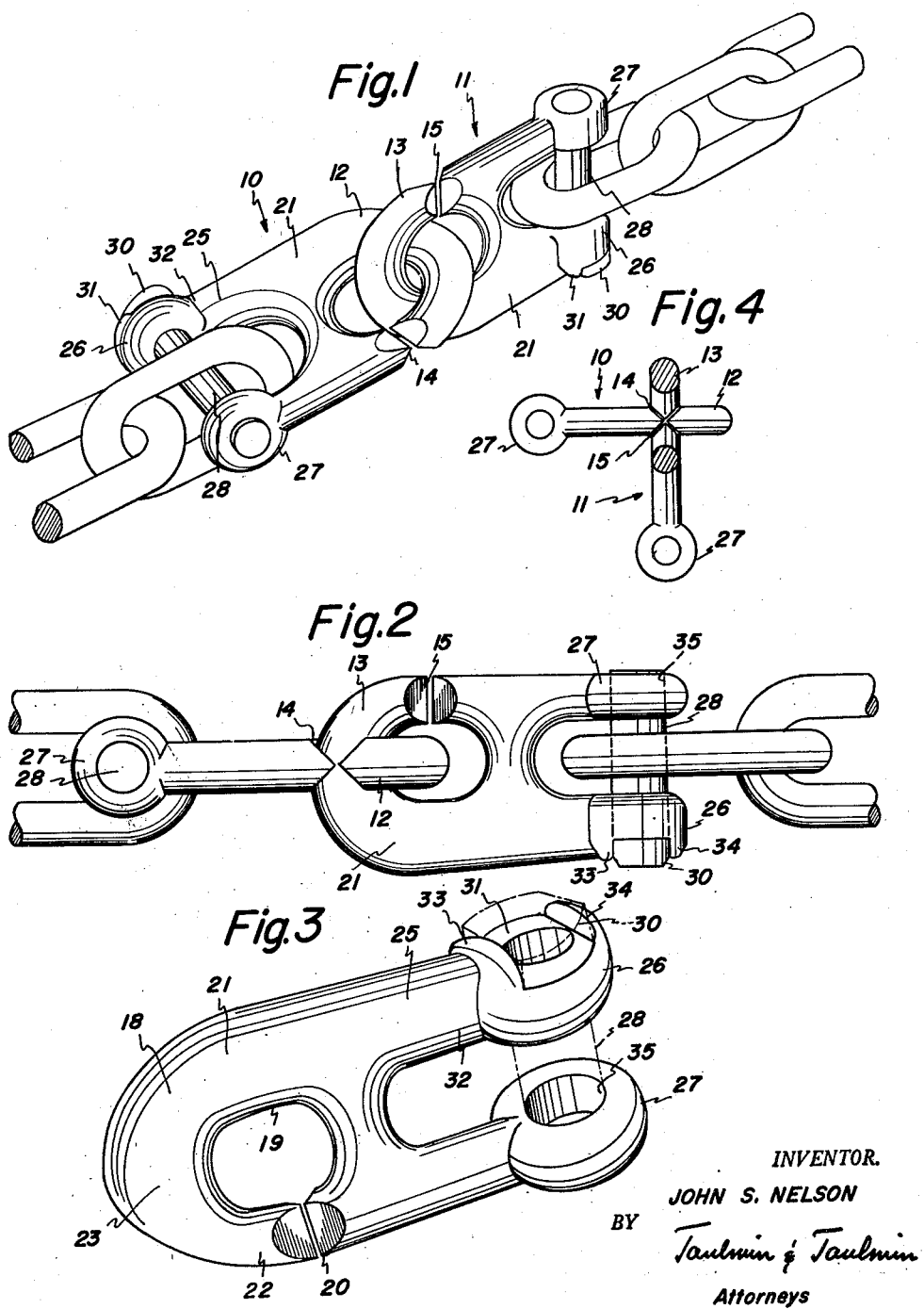
INVENTOR.
JOHN S. NELSON
BY
Taulmin & Taulmin
Attorneys

2,824,421

CHAIN ATTACHMENT HAVING A SPLIT LOOP PORTION AND A CLEVIS PORTION

John Stanley Nelson, Buffalo, N. Y.

Application April 9, 1956, Serial No. 576,964

1 Claim. (Cl. 59—85)

My invention relates to chains, and more particularly to chain hooks for fastening chain links together.

It is known to manufacture chain links comprising a solid side and a split or notched side, and which links are suitably shaped for subsequent welding after the links are temporarily spread to receive a solid link. Such cut-a-way and welded chain links, however, are costly to manufacture and the requisite welding step introduces a factor which often results in producing a chain with a weak or defective link. The present invention eliminates any need of welding and provides a slip bolt hook having cooperating stud link portions which are provided with an open or split section for interlinking the stud links, and comprising an integral eye bolt section for fastening the hook to a chain link.

Another object of the invention is to provide a chain hook of the character described which comprises a pair of cooperating U-shaped link members which are adapted to be interlinked or coupled together and detachably secured by a slip bolt to a chain link.

Another object of the invention is to provide a chain hook as described which comprises a pair of stud links each of which has a cut-a-way or split section for fastening the stud links together, the stud links comprising an integral open end section forming an eye bolt which is closed by a slip bolt.

Another object is to provide a chain hook which is particularly useful for coupling cast chain links which links are made of castings formed from light metals or alloys such as aluminum or bronze.

Another object is to provide a slip bolt hook as described for coupling the end links of cast aluminum or bronze or the like to form a continuous chain.

Still another object of the invention is to provide a hook or coupling for chains which is readily attached and detached from chain links to couple or uncouple the same.

These and other objects and advantages of the invention will become apparent from the following taken in conjunction with the drawings, wherein a preferred embodiment of the invention is illustrated.

Figure 1 depicts in perspective a chain section utilizing a slip bolt hook constructed in accordance with this invention;

Figure 2 is a plan view of the coupling hook and chain structure illustrated in Figure 1, and showing the slip bolt hook attached to adjacent chain links, the latter being shown broken away;

Figure 3 is a view in perspective of one of the stud-link slip bolt hook members, the same being drawn on an enlarged scale as compared to Figures 1 and 2, the slip bolt for fastening the U-shaped eye portion of the hook to a chain link being shown in dotted lines;

Figure 4 is a plan view partly in section, illustrating the split sections of the cooperating stud links and the manner of interlinking the same.

Referring to the drawing and more particularly to Figures 1 and 2, there is illustrated a slip bolt hook made in accordance with this invention. The hook comprises a pair of cooperating slip bolt hooks, generally designated 10 and 11, which are of like shape and construction, and as best shown in Figure 3, which are adapted to be linked together with their vertical axis orientated at 90° with respect to each other, as illustrated in Figure 1. Each of the slip bolt hooks 10 and 11 is provided respectively with stud link portion 12 and 13 and a split section, as illustrated at 14 and 15.

The slip bolt hooks 10 and 11, as shown in Figures 1 and 2, are interlinked through their stud link portion, as by turning one of the links at right angles to the other and engaging the respective split sections 14 and 15 together, as shown in Figure 4, so that they are contiguous and whereby the links can be engaged and interlocked, as illustrated in Figure 2.

The shape and construction of the stud link portion of the hook is illustrated in the enlarged perspective view in Figure 3. The same comprises a hook section generally indicated at 18, which is open at 19 and comprises a 90° cross split section 20, as in Figure 4. A thickened link portion 21 disposed diametrically opposite from the split section 20 is made substantially twice as thick as the link portion 22 which includes the split section. A load-receiving section 23 forming the forward end of the stud link portion is of substantially the same thickness as at 22 so that the load can be properly distributed over the hook to prevent bending of the link under load stresses.

For connecting the hook to a chain link, the hook comprises an integral U-shaped eye bolt section as generally indicated at 25, and best shown in Figure 3. This eye bolt section comprises apertured end portions 26 and 27, the apertures of which are of a diameter for receiving a bolt 28, as illustrated in dotted lines in Figure 3. The bolt 28 comprises a rectangular shaped head 30 which is adapted to be countersunk into a like shaped portion 31 on the apertured leg member 32 of the U-shaped eye bolt section. Abutments 33 and 34 on the apertured end portion 26 prevent rotation of the bolt when in place.

Bolt 28 is slip-fit in the apertured end portions 26 and 27 as illustrated in Figure 3, the apertured leg portion 27 is shaped, as at 35, to receive the lower extremity of the slip bolt 28, as shown in Figure 3. Preferably the bolt is frictionally fit in the apertured section so that the bolt 28 will not slip out upon movement of the chain, but may be easily forced out of the eye bolt section when it is desired to remove the hook members. If desired, however, the bolt 28 may be threaded on its end portion to receive a nut.

In forming the stud-link slip bolt hook, the same may be cast from aluminum or bronze using permanent molds such as disclosed in my copending application for Patent Serial No. 366,445. The slip bolt hook of my invention may be made of ferrous or non-ferrous metals or alloys as desired, and depending upon the particular condition under which the hook is to be subjected in use.

The invention is especially useful for cast aluminum chains, and for repairing chains where one or more links have been worn or broken. An efficient hook is provided for coupling chain links together and detachably fastening thereto by means of the slip bolt which is inserted after engaging the U-shaped eye section of the hook with the link of the chain to which the hook is to be fastened. In this manner the end links of chains may be coupled together or uncoupled with ease and a complete continuous chain provided, as desired.

While I have described the invention as particularly adapted for use in cast aluminum or bronze chains, it will be obvious that the slip bolt hook of the invention may be used wherever a hook means is desired, for example in the use of hooks attached to ropes, cables or the like. Further, various modifications and changes in the details of construction as herein shown and described may be made without departing from the spirit and scope of the invention, and which merely illustrates the preferred embodiment thereof.

What is claimed is:

As an article of manufacture, a hook for coupling chains or cable lengths, said hook comprising a pair of interlinkable U-shaped aluminum stud link members, each of said link members having a forward stud link portion and an eye bolt apertured portion integral therewith at the opposite end from said stud link portion, a slip bolt disposed in said apertured portion for interlinking said hook with a chain link, and a cross-split open section and a side straight-away portion of said stud link portion for interlinking the forward respective stud link portions of said hook to fasten the same together and releasably couple the chain lengths, a thickened wall portion disposed diametrically opposite from said cross-split open section and forming the forward load stress-receiving portion of the hook, an integral cross link portion joining the opposite sides of the hook between said split open section and said eye bolt apertured portion, said bolt having a rectangular shaped head, and said eye bolt portion comprising parallel leg members which form integral extensions of said stud link, said leg members having apertured end portions which are in registration to receive said slip bolt, one of said apertured end portions having a rectangular shaped countersunk head for engaging the headbolt end of said slip bolt to prevent rotation of the bolt when in place.

References Cited in the file of this patent

UNITED STATES PATENTS

| | | |
|---|---|---|
| 245,448 | Church | Aug. 9, 1881 |
| 367,969 | Gawn | Aug. 9, 1881 |
| 389,493 | Baker | Sept. 11, 1888 |
| 682,361 | Keith | Sept. 10, 1901 |
| 1,222,997 | Rothmer | Apr. 17, 1917 |